Nov. 2, 1948.  R. R. STABLER  2,452,697
DEVICE FOR SHARPENING HYPODERMIC NEEDLES
Filed May 20, 1947  2 Sheets-Sheet 1
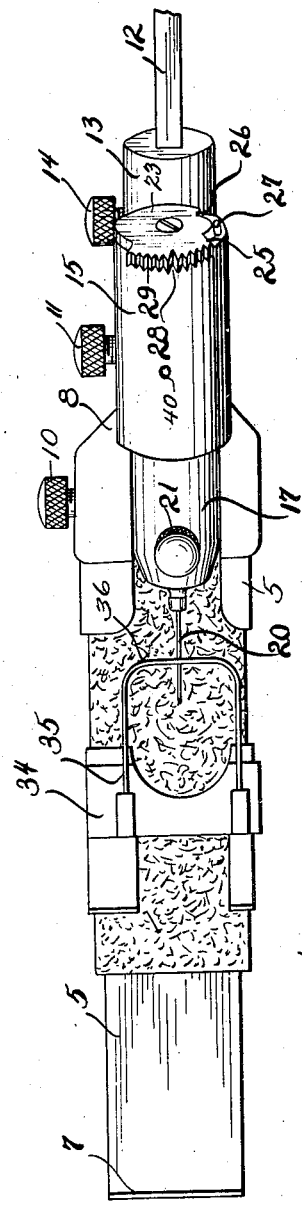
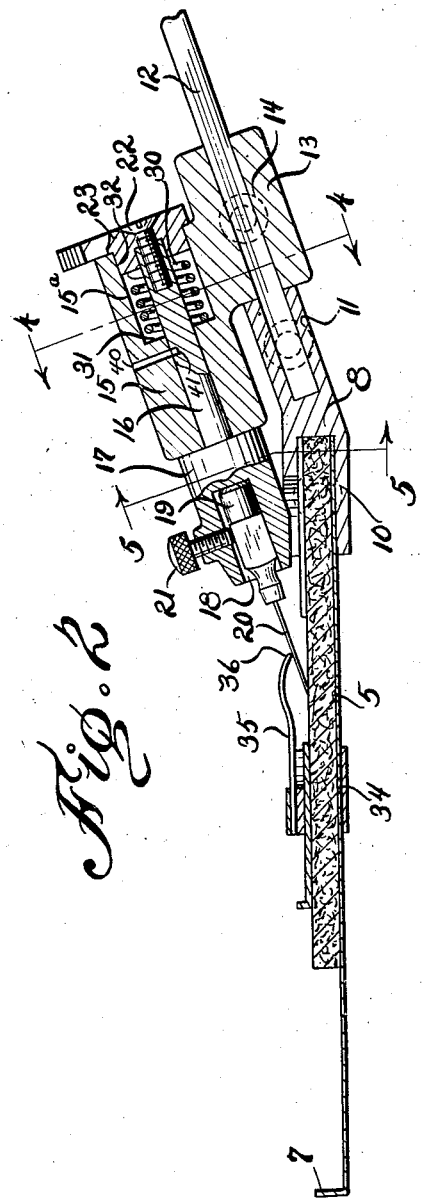
INVENTOR.
Robinson R. Stabler
BY
Shepherd Campbell
Attorneys Nov. 2, 1948.                R. R. STABLER                2,452,697
                 DEVICE FOR SHARPENING HYPODERMIC NEEDLES
Filed May 20, 1947                                 2 Sheets-Sheet 2

INVENTOR.
Robinson R. Stabler,
BY
Shepherd & Campbell
attorneys

Patented Nov. 2, 1948

2,452,697

UNITED STATES PATENT OFFICE 2,452,697

DEVICE FOR SHARPENING HYPODERMIC NEEDLES

Robinson Ryland Stabler, Greensboro, N. C.

Application May 20, 1947, Serial No. 749,207

17 Claims. (Cl. 51—59)

This invention relates to a device for easily, quickly and accurately sharpening the points of hypodermic needles. By the use of this device hypodermic needles which have become blunted or damaged may be restored to a condition as good as new needles and at a very slight cost.

The nature and advantages of the invention will be best understood by reference to the accompanying drawings in which like reference characters designate corresponding parts throughout the several views and in which:

Fig. 1 is a plan view of a device constructed in accordance with the invention.

Fig. 2 is a longitudinal sectional view therethrough.

Figure 3:
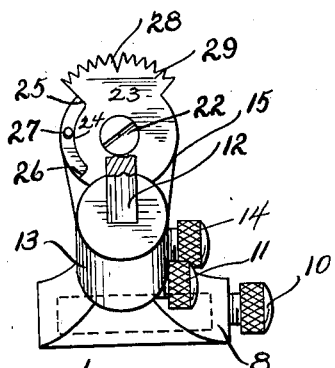
Fig. 3 is an end elevation.
Figure 4:
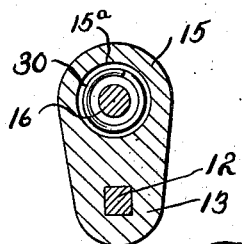
Fig. 4 is a transverse sectional view upon line 4—4 of Fig. 2.
Figure 5:
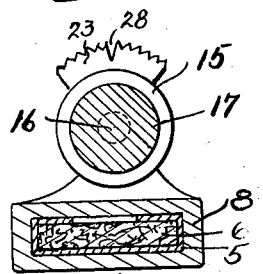
Fig. 5 is a transverse sectional view upon line 5—5 of Fig. 2 and Figs. 6, 7 and 8 are greatly magnified views of different forms of needle points which may be formed with this invention.

In the drawings 5 designates a housing or frame in which an abrasive hone or slab 6 is mounted for reciprocation. The movement of the hone toward the left is limited by an upstanding stop 7. The forward end of a socket 8 receives the rear end of the frame 5. The socket and the frame may be permanently united or they may be secured together by a set screw indicated at 10. Secured within the socket 8 by a set screw 11, or otherwise, is a guide bar 12. This bar is angular in cross section (preferably square) and it has mounted thereon a sleeve 13. A set screw 14 traverses the sleeve and binds against the bar 12 to hold the sleeve and associated parts in any adjusted position upon the bar 12 but especially to hold it against movement when it has been adjusted to the position illustrated in Fig. 2. It should be noted that bar 12 lies at an acute angle to the plane of the upper face of slab 6. Thus when sleeve 13 is slid downwardly along this guide bar it carries the needle downwardly toward the honing slab. However the disposition of the guide bar at an acute angle to the plane of the slab causes the approach of the needle point toward and into contact with the slab to be so gentle as not to damage the delicate needle point. The sleeve 13 carries a bearing housing 15 and the shaft 16 of a chuck 17 is mounted for oscillation in said housing.

At its forward end the chuck is provided with a cavity 18 for the reception of the hub 19 of the hypodermic needle 20. This hub 19 is bound firmly in the cavity by a set screw 21, during the sharpening operation. The term chuck is to be construed to mean any structure at the forward end of the shaft 16 for engaging the hub of a conventional hypodermic needle with such firmness as to cause the needle to turn with the shaft and to be held in axial alignment with said shaft.

The rear end of the shaft is secured by a screw 22 to an actuating plate 23. The plate 23 is cut away at 24 to provide stop walls 25 and 26 at each end of the cut away portion. These walls make contact with a pin 27 to limit the oscillatory movement of the plate in either direction. The throw is preferably about 45 degrees upon each side of the central position of the plate and this central position is occupied by the plate and consequently by the bevel upon the needle when a sight opening 28 at the top of the plate lies vertically above the axis of the shaft 16. The upper edge of the plate is preferably extended beyond the diameter of the bearing 15 and is serrated to provide a firm grip for the thumb or finger of the operator.

The bearing housing 15 is recessed as indicated at 15a for the reception of a spring 30 which bears between the inner end wall 31 of the recess and a hub 32 of plate 23. This spring exerts tension against the oscillating plate and holds the shoulder of the chuck securely against the end of the bearing thus preventing any longitudinal motion of the chuck or needle. A slide 34 mounted upon the housing 5 carries a yoke 35 of spring material. The intermediate portion of this yoke bears upon the needle and insures firm contact of the needle with the hone, during the reciprocation of the latter.

By referring to Fig. 3 it will be seen that the center line of the chuck and associated parts does not lie directly above the longitudinal center line of the housing or frame 5. Upon the contrary it is slightly offset to one side. Thus by reversing the hone end for end and also reversing the hone by turning it upside down I bring many different portions of the hone into operative relation to the needle and prevent excessive grooving of the hone.

The operation of the device is as follows: Set screw 14 having been loosened the sleeve 13 is moved far enough to the right upon the square bar 12 to permit the insertion of the hub 19 of the hypodermic needle into the socket 18. There it is bound securely in place by the set screw 21. Sleeve 13 together with the needle is then lowered to the position illustrated in Fig. 2 and is bound securely in place to prevent any movement of the needle during the honing operation. Slide 34 is then slipped to the right to bring the transverse portion 36 of the spring yoke 35 to rest upon the needle, thus holding the point of the needle into firm contact with the hone. The operator then reciprocates the hone beneath the needle by grasping the left hand end portions of the hone between the thumb and forefinger. It will be noted that the rear portion of the housing 5 consists merely of a single plate underlying the hone. Thus free access may be had to the hone for the purpose of grasping and reciprocating it in the manner described.

If, during the honing operation the plate 23 be left in the position illustrated in Fig. 3, then a conventional straight flat bevel A will be formed upon the needle.

Figures 7, 8:
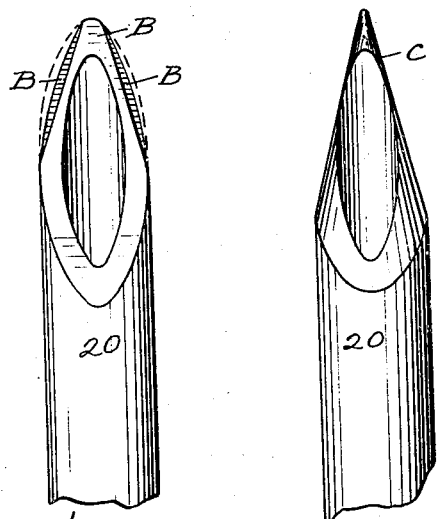

If upon the other hand plate 23 be moved first to one side and left there during a sufficient length of time to chamfer off one side of the bevel (Fig. 7) or in other words to reduce the bevel from the dotted line to the full line position illustrated in Fig. 7 and if the operation be then repeated upon the other side of the needle, a needle having a triple bevel point will be secured as illustrated at B, Fig. 7.

If the operator turns the plate 23 back and forth to its limit of movement and repeats this throughout the grinding operaion or reciprocation of the hone, then the needle will be further reduced to provide the partially beveled and partially conical and quite sharp point illustrated at C in Fig. 8. It will be understood that in the formation of Figs. 7 and 8 the bevel of Fig. 6 is first produced.

Figure 6:
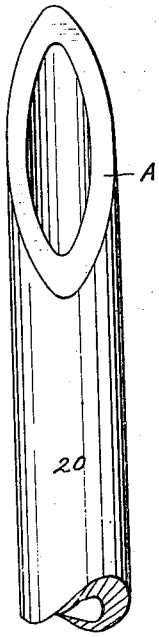

The bevel A of Fig. 6 is the form of point generally secured by those who sharpen their own needles. This point is the least sharp of any of those illustrated and would make the longest incision in use. The bevel of Fig. 7 is sharper than that of Fig. 6 but not as sharp as that of Fig. 8. Fig. 8 yields the keenest point and therefore causes a minimum of pain in the use of the needle. I am aware of the fact that tools have heretofore been devised for sharpening chisels and other tools having determined angles upon them. However I know of no device capable of reclaiming hypodermic needles and of forming upon them the highly meritorious and efficient points herein shown and described.

It should be noted that the assembly of associated parts which slide along the square bar 12 may be removed for the purpose of inspecting the bevelled surface development during the process of honing without disturbing the relative position of any of the component parts which might destroy the original setting. This may be accomplished by merely releasing thumb screw 11. Conversely the assembly in its entirely may be returned to its exact original position without having disturbed the setting of any of its component parts or its relative position in relation to the hone, therefore the resumption of honing may be carried on without any re-adjustments. I may if desired positively lock shaft 16 in its centered position when forming the bevel of Fig. 6 by merely dropping a locking pin (not shown) through an opening 40 of bearing housing 15 so that the end of the pin may engage in a recess 41 of shaft 16. Since hypodermic needles are quite small, and since the chuck assembly and bearing housing 15 may be dismounted as a whole from square shaft 12, and since the frame and hone are separable from socket 8, the whole apparatus may be packed in a kit or case of vest pocket size. I wish it to be understood that the invention is not limited to the precise construction set forth, but that it includes within its purview whatever changes fairly come within the terms of the appended claims.

Having described my invention what I claim is:

1. A device for restoring the points of hypodermic needles which comprises an elongated honing slab having a plane upper face, a frame in which said slab is disposed for longitudinal guided reciprocation, said frame being shaped to permit the slab to be grasped and manually reciprocated endwise, a member, a shaft by which said member is carried, said member comprising means for receiving and engaging the hub of a hypodermic needle, a bearing housing in which said shaft is mounted to turn, a guide extending lengthwise of and away from one end of the frame, means for mounting the bearing housing for bodily adjustment along said guide toward and from the honing slab, said guide lying at an acute angle to the plane of the upper face of the slab, said angle being such that when the bearing housing and member are advanced toward the slab and along said guide the usual angular face of the needle rests flat upon the upper face of said slab, and means for binding the housing to the guide at varying points in the length of said guide to limit the movement of the needle toward the slab and to thereby limit the pressure of the needle point upon said slab.

2. A structure as recited in claim 1 wherein the said guide is sufficiently offset laterally with respect to the slab to dispose the chuck and the needle carried thereby to one side of the longitudinal center of the slab.

3. A structure as recited in claim 1 in combination with means carried by the frame and engaging the needle to maintain tension upon the needle to press it toward the face of the slab.

4. A structure as recited in claim 1 in combination with a slide mounted upon the frame and movable toward and from the chuck and a spring carried by said slide adapted to ride upwardly over the inclined needle and to maintain pressure upon the needle toward the surface of the slab during the reciprocation of the slab to sharpen the needle.

5. A device for restoring the points of hypodermic needles which comprises, a frame, a hone in the form of a slab having a flat upper face, said hone being mounted to reciprocate longitudinally in said frame, a guide member carried by said frame, a chuck carrying member mounted for adjustment upon said guide member lengthwise of the frame and toward and from the said slab and in a plane which lies at an acute angle with respect to the frame, a chuck mounted for oscillation upon said member, means carried by the chuck for engaging and holding the hub of a hypodermic needle, means for binding the chuck carrying member at desired points along its path of adjustment to limit the pressure of the needle point upon the hone under the influence of the movement of the chuck carrying member toward the hone and additional means supported from the frame and bearing upon the side of the needle for maintaining a determined degree of tension upon the needle and toward the hone.

6. A machine for restoring the points of hypodermic needles which comprises, a hone in the form of an elongated flat slab, a frame in which said hone is mounted for longitudinal reciprocation and an elongated guide member at the rear end of the frame, said guide member being angular in cross section, a sleeve slidably mounted upon said guide member, means for binding said sleeve to the guide member at any point thereon, a bearing housing carried by said sleeve, a chuck comprising a shaft that is mounted to turn in said housing, said shaft lying in parallelism with said guide member and means carried by the chuck for engaging and holding the hub of a hypodermic needle, said guide member lying at an acute angle with respect to the plane of the upper face of the honing slab and extending in the direction of the longitudinal axis of the frame.

7. A structure as recited in claim 6 in combination with manually operable means engaged with the chuck for oscillating the same.

8. A structure as recited in claim 6 in combination with manually operable means engaged with the chuck for oscillating the same about the axis represented by the needle and means for limiting the oscillation of said chuck to a measured degree in both directions beyond a central point.

9. A device for restoring the points of hypodermic needles which comprises, a hone in the form of an elongated slab having plane upper and lower faces, a frame in which said slab is mounted for longitudinal reciprocation, a guide bar at the rear end of said frame, a sleeve slidably mounted upon said guide bar, said guide bar lying at such an angle as to cause the sleeve to move toward and from the hone in a plane lying at an acute angle with respect to the slab, an oscillatory shaft journalled in said sleeve, a chuck at the forward end of said shaft, said chuck having a cavity for the reception of the hub of a hypodermic needle, means for binding said hub of a needle in said chuck and a manually operable member carried by said shaft for oscillating the shaft and chuck.

10. A structure as recited in claim 9 in combination with spring means for maintaining a tension upon the shaft.

11. A structure as recited in claim 9 wherein the means for oscillating the shaft comprises, a plate having a serrated edge with a sight opening at a central point thereof and a pair of stops and means upon said sleeve engageable by said stops for limiting the throw of the plate and consequently the throw of the chuck to approximately 45 degrees upon each side of the center line.

12. A structure as recited in claim 9 wherein the chuck and the parts by which it is carried are offset laterally with respect to the frame to a degree to dispose the contacting point of the needle to be sharpened in an offcenter position upon the hone.

13. A structure as recited in claim 9 in combination with a slide mounted upon the frame for movement toward and from the chuck and a spring yoke carried by the frame and having its intermediate portion extending across the hone, said intermediate portion being shaped to ride up over the needle and exert a downward tension thereon when the slide is thrust toward the chuck.

14. A device for restoring the points of hypodermic needles comprising a hone in the form of an elongated flat slab, an elongated frame in which said slab is mounted for longitudinal reciprocation, said frame having its sides open to a degree to permit the hone to be grasped and manually reciprocated, a stop for limiting the outward movement of the slab in the frame, a guide bar angular in cross section and inclined upwardly in an acute angle with respect to the frame, means for securing the frame to said guide bar, a sleeve slidably mounted upon said guide bar, means for binding the sleeve for movement upon the guide bar, a bearing carried by the sleeve, a shaft mounted in said bearing and having a chuck at its forward end, said chuck comprising a member having a cavity of a size to receive the hub of a hypodermic needle, a binding member carried by the chuck for binding the said hub of the needle in said chuck, a manually operable plate comprising a part adapted to be engaged by a thumb or finger of the operator to oscillate the plate back and forth, means for connecting said plate to the chuck and limiting means associated with the plate for limiting its oscillation to approximately 45 degrees upon each side of the center.

15. A structure as recited in claim 14 in combination with a slide mounted for longitudinal movement upon the frame and toward and from the chuck and a spring carried by said slide adapted to overlie the needle and to press the needle toward the slab, when the slide is forced toward the chuck.

16. A structure as recited in claim 14 wherein the chuck has a shaft extending through said bearing and to which shaft the said operating plate is secured and a spring surrounding said shaft and bearing between said plate and a part of the bearing to maintain longitudinal tension upon the chuck.

17. A device for restoring the points of hypodermic needles which comprises an elongated honing slab having a plane upper face, a frame, means for mounting said slab for guided endwise reciprocation in said frame, a guide member extending in the direction of the length of the frame and beyond the end of the frame and lying at an acute angle to and above the plane of the upper face of the honing slab, a shaft, a bearing housing for said shaft, means carried by the forward end of the shaft for grasping the rear portion of a hypodermic needle and holding said needle in axial alignment with said shaft, an element slidably mounted upon the guide member, by which the bearing housing is carried, means for binding said element at varying positions of adjustment along the guide member, a spring tensioning element shaped to engage the upper side of the needle and a slide mounted for endwise adjustment along the frame by which said tensioning element is carried.

ROBINSON RYLAND STABLER.

REFERENCES CITED

The following references are of record in the file of this patent:

UNITED STATES PATENTS

| Number | Name | Date |
| --- | --- | --- |
| 1,095,338 | Mallory | May 3, 1914 |
| 1,981,174 | Hille | Nov. 20, 1934 |
| 2,088,056 | Foster | July 27, 1937 |
| 2,142,923 | Stocking | Jan. 3, 1939 |
| 2,165,929 | Lentz | July 11, 1939 |
| 2,286,141 | Kurtz | June 9, 1942 |
| 2,287,910 | Slack | June 30, 1942 |
| 2,324,025 | Revell | July 13, 1943 |
| 2,402,245 | Freeland | June 18, 1946 |